(12) United States Patent
MacGuire

(10) Patent No.: US 8,464,940 B2
(45) Date of Patent: *Jun. 18, 2013

(54) CONSUMER SELF-ACTIVATED FINANCIAL CARD

(76) Inventor: Sean MacGuire, Key West, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/157,571

(22) Filed: Jun. 10, 2011

(65) Prior Publication Data

US 2012/0036066 A1 Feb. 9, 2012

Related U.S. Application Data

(63) Continuation of application No. 11/995,625, filed as application No. PCT/US2006/027280 on Jul. 13, 2006, now Pat. No. 7,984,851.

(60) Provisional application No. 60/698,499, filed on Jul. 13, 2005.

(51) Int. Cl.
*G06F 7/08* (2006.01)

(52) U.S. Cl.
USPC ......... 235/381; 235/382; 235/382.5; 235/383

(58) Field of Classification Search
USPC .................. 235/381, 382, 382.5, 383
See application file for complete search history.

(56) References Cited

U.S. PATENT DOCUMENTS

| 4,616,852 | A | 10/1986 | Cash |
| 5,883,810 | A | 3/1999 | Franklin et al. |
| 5,984,180 | A * | 11/1999 | Albrecht ...................... 235/380 |
| 6,189,787 | B1 | 2/2001 | Dorf |
| 6,193,155 | B1 | 2/2001 | Walker et al. |
| 6,220,511 | B1 | 4/2001 | Holec et al. |
| 6,422,462 | B1 | 7/2002 | Cohen |
| 6,488,206 | B1 * | 12/2002 | Flaig et al. .................... 235/380 |
| 6,578,761 | B1 | 6/2003 | Spector |
| 6,636,833 | B1 * | 10/2003 | Flitcroft et al. ................ 705/64 |
| 7,984,851 | B2 * | 7/2011 | MacGuire ..................... 235/381 |
| 2003/0200180 | A1 | 10/2003 | Phelan, III et al. |
| 2004/0232225 | A1 | 11/2004 | Bishop et al. |

OTHER PUBLICATIONS

International Search Report for PCT Application No. PCT/US2006/027280 mailed Jan. 31, 2007.

* cited by examiner

*Primary Examiner* — Kristy A Haupt
(74) *Attorney, Agent, or Firm* — Ungaretti & Harris LLP

(57) ABSTRACT

A pre-encoded financial card is disclosed along with a system and method allowing a user to attach it to pre-existing accounts and activate it instantly.

26 Claims, 4 Drawing Sheets

CONSUMER SELF-ACTIVATED FINANCIAL CARD

CROSS REFERENCE TO RELATED APPLICATIONS

This Application is a continuation of application Ser. No. 11/995,625 filed on Jul. 22, 2008, now U.S. Pat. No. 7,984,851 B2 which is a national stage entry of PCT/US2006/027280 filed Jul. 13, 2006, which claims priority from U.S. Provisional Application No. 60/698,499, filed Jul. 13, 2005, which is herein incorporated by reference.

FIELD OF THE INVENTION

The present invention relates to the banking system, and, more particularly, to a system, method and apparatus for allowing consumers to substantially instantly self-activate a financial card and attach it to pre-existing accounts.

BACKGROUND OF THE INVENTION

With the introduction of financial tools like debit cards, smart cards and other "stored value" cards, consumers have more ways to access funds than ever before. Likewise, the number of systems which can use these devices, like ATMs, debit terminals, telephone IVR systems, and internet-based systems have similarly multiplied in number. One of the effects of this increase in electronic access cards and systems is a corresponding increase in our dependence on electronic funds transactions.

To perform many of these financial transactions, some sort of financial card is needed. This could be an ATM card, Debit card, or credit card, or smart card. Many of these cards contain a magnetic strip which is encoded with a unique number. This unique card number is then associated by the issuer with one or more accounts owned or controlled by the client. These cards are issued directly by banks or other financial service companies, and tend to either be mailed to the client's home address, or given to the client in person at a bank branch by bank personnel. This is a time consuming, complicated manual process.

Once the users have access to this financial card, they may perform electronic transactions with the accounts associated with the card, for example, getting cash from their checking account via an ATM machine. However, should the users not have access to their card(s), for whatever reason, they are obviously prevented from benefiting from the use of these machines.

In the case where a user's card has been lost or stolen, replacing the card is liable to be time-consuming, with the user needing to physically present himself/herself at the bank branch to request a replacement, or calling the bank by telephone and having replacement cards sent by mail.

In many cases this delay may represent a significant hardship, especially in circumstances where the user has had his/her wallet or purse, containing said cards, stolen, and doubly so if this has happened outside of banking hours. In such circumstances, restoring a user's access to cash becomes critical, but is often complicated by the loss of identification contemporaneous to the loss of the cards, since both are often stored in the same location.

Flitcroft in U.S. Pat. No. 6,636,833 teaches a credit card system and method which uses temporary credit card numbers which become inactive after a certain period or amount of use. Holec in U.S. Pat. No. 6,220,511 describes a card issuance system and process which is essentially a machine which would print cards for a user. Walker in U.S. Pat. No. 6,193,155 discloses a method and apparatus for issuing gift certificates attached to credit cards or other financial accounts. Dorf in U.S. Pat. No. 6,189,787 teaches of a multifunctional card which may be attached to a number of different types of accounts, such as financial, gift card, phone card, medical, etc. Cash in U.S. Pat. No. 4,616,852 discloses a system for issuing ATM cards based on paper forms which can be mailed into the bank so no physical presence would be required.

Spector in U.S. Pat. No. 6,578,761 discloses a means by which customers can create 'satellite' cards based on a pre-existing account with the new cards being emitted by printing on a computer, or picking up at a kiosk. Cohen in U.S. Pat. No. 6,422,462 teaches of a consumer-controlled credit card which could be allowed only certain amount of credit, certain types of transactions (I.e. meals), time or use limited, numbers controlled by a calculator-size device, and could further be delivered to the customer disabled, and enabled by the customer as needed. Franklin in U.S. Pat. No. 5,883,810 (Microsoft) discloses a similar temporary card number scheme wherein the user requests a transaction number from his/her issuing institution, which looks and is handled exactly like a regular credit card number.

As seen hereinabove, there has been much activity around the process of issuing cards. However, there is still no simple way for a user to instantly obtain a financial card without contacting the issuer either by travelling to a location where cards are issued, or contacting the issuer by phone or by mail and waiting.

Therefore, a need has arisen for a system, method and apparatus which eliminate or reduce the problems associated with known methods of obtaining financial cards, and which would allow users to substantially instantly self-activate a financial card and attach it to pre-existing account(s).

SUMMARY OF THE INVENTION,

It is an object of the present invention to provide improved financial cards and methods for financial card transactions.

It is also an object of the present invention to provide pre-encoded financial cards for use in financial transactions.

It is a further object of the present invention to present a system that allows customers to determine and select which pre-existing accounts to make available using this financial card.

It is a still further object of the present invention to provide for substantially instant customer activation of financial cards.

It is a still further object of the present invention to provide a system which permits the use of financial cards not encoded with the financial institution's routing number associated with the accounts attached to the card to be routed to the correct financial institution.

Therefore, in accordance with the present invention, there is provided a method for obtaining a new financial card for a user, the method comprising the steps of: a) having the user select a new card corresponding to the type of pre-existing account intended to be accessed with the new card; b) having the user provide sufficient identification information thereon; c) contacting the financial institution controlling the pre-existing account; and d) activating the new card upon acceptance by the financial institution.

Also in accordance with the present invention, there is provided a computer implemented method for providing a new financial card to a user, the method to be implemented over at least one communication network by a financial transaction system adapted for communicating over the network, said transaction system comprising at least one financial institution and at least one terminal, the method comprising the steps of: a) initiating at the terminal a request for a new card to be associated with an existing account; b) establishing a communication link over the network between the terminal and the financial institution controlling the existing account; c) having the financial institution evaluate the request for the new card; and d) activating the new card upon acceptance by the financial institution.

Further in accordance with the present invention, there is provided a system for providing a new financial card to a user upon a user's request therefor, comprising a financial transaction system capable of receiving the request, of transmitting the request to a financial institution and, where the financial institution has approved the request, of providing an activated new card, the new card being associated with an existing account at the financial institution, the financial transaction system comprising a terminal and a communicating device for allowing the terminal to communicate with the financial institution over at least one communication network, a card-providing means being, provided for providing the activated new card to the user.

Other aims, objects, advantages and features of the present invention will become more apparent upon reading of the following non-restrictive description of specific embodiments thereof, given by way of example only with reference to the accompanying drawings.

Figure 1:
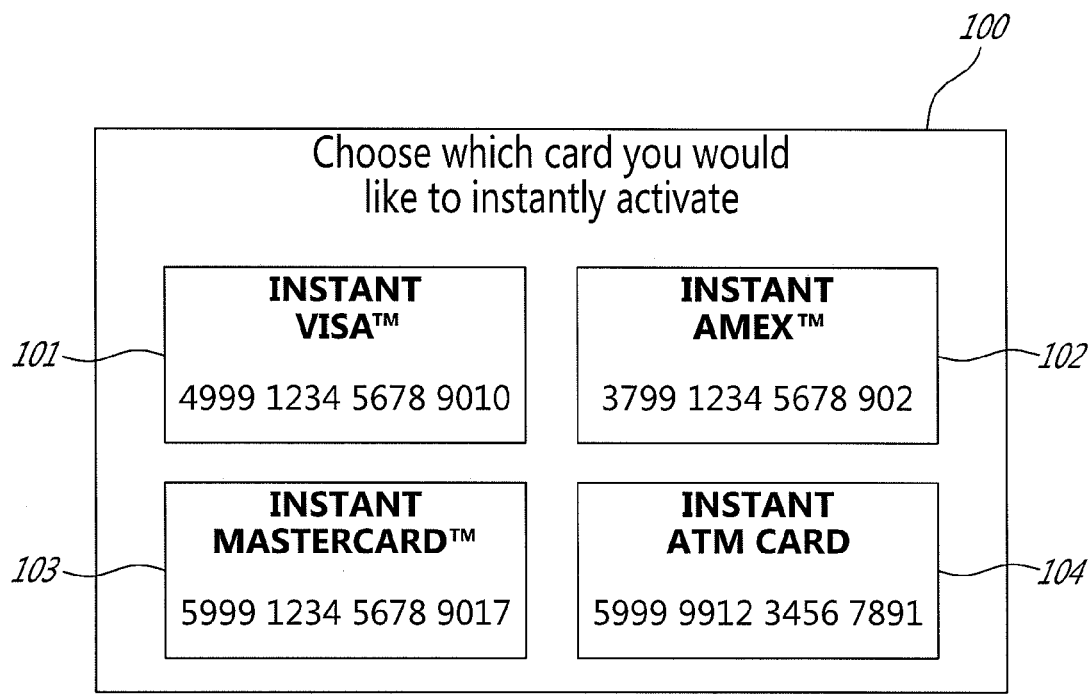
FIG. 1 is a schematic diagram of a retail display of cards to be available for selection by a user for activation.

DESCRIPTION OF ILLUSTRATIVE
EMBODIMENTS OF THE INVENTION

In accordance with the present invention, one embodiment that addresses the problem of acquiring, enabling and activating new financial cards, is disclosed herein.

With reference, e.g., to [http://www.merriampark.com/anatomycc.htm] and [http://www.ansi.org/other services/registration programs/iin registration.aspx?menuid=10], which is herein incorporated by reference, bank and credit cards are numbered according to the International Standards Organization (ISO/IEC 7812-1:1993) and the American National Standards Institute (ANSI X4.13). These standards dictate that financial cards are numbered with the first digit on a card identifying an industry group, the following 5 digits representing the issuer, followed by an account number and finally a check digit. These first 6 digits on a card are called the IIN: Issuer Identification number and the ISO/IEC 7812 Registration Authority (the American Bankers Association) produces the official record of IIN assignments, the ISO Register of Card Issuer Identification Numbers.

With reference, for instance, to [http://www.moneycontrol.com/cards/cardsinfo/working.php], which is herein incorporated by reference, for credit card numbers specifically the first digit signifies the system, 3 being for travel and entertainment cards like American Express™ cards which start with 37, and Diner's Club™ which starts with 38, the starting digit 4 being assigned to Visa™ with digits 2 though 6 representing the bank number, and Mastercard™ starts with a 5, with digits two and three, two through four, two through five or two through six being the bank number, depending on whether digit two is a 1, 2, 3 or other. In addition, since the numbering is standard, it would be very confusing to issue a Visa™ card starting with the number "7". Not only would it not be routed correctly, but also no electronic verification systems would be able to identify this number as a Visa™ card.

Therefore, the financial cards of the present invention typically respect the current numbering conventions, and in the case of credit cards, we would further expect that credit card companies who participate in this system pre-allocate card numbers for the present system to use.

Referring thus to FIG. 1, pre-printed and pre-encoded financial cards are distributed in a manner where they may be obtained by a user needing to access an account electronically 100. Each card will have printed on it and encoded a unique and valid card number, and will be grouped by the type of account the user wishes to access, for example a Visa™ card 101, American Express™ card 102, Mastercard™ 103, ATM card 104, etc.

Cards may be branded with the logos of appropriate companies, and may be encoded with pre-allocated account numbers assigned by those institutions.

In the case of cards where institutions do not provide pre-allocated account numbers, cards will be encoded with pre-allocated numbers issued by the operator of the service, whose IIN shall be the first 6 digits of the card number.

The user simply selects the card corresponding to the type of account they wish to access.

Next, information must be collected in order to be able to activate the card. This information may be collected in any number of ways, including via a computer program, or by having the user call a telephone IVR system.

Figure 2:
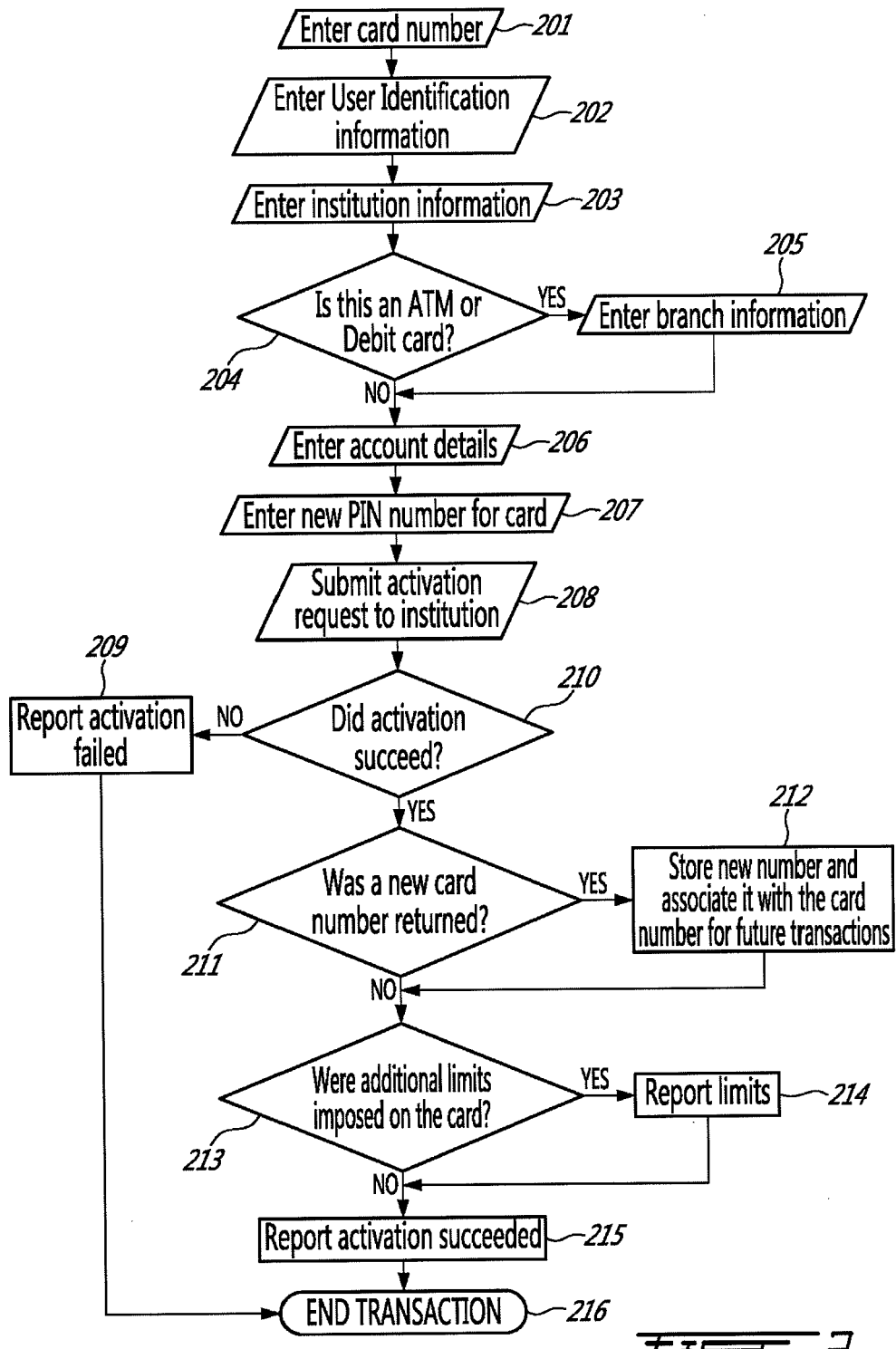
FIG. 2 is a flowchart depicting the card activation process.

Referring now to FIG. 2, the user enters the card number at 201, provides identification information at 202. This identification information must be sufficient to identify and authenticate the user. This information may include, but is not limited to, the user's name, Social Security number, birth date, home telephone number, any or all of their home address information, previous PIN numbers, previous card or account numbers, credit limits, mother's maiden name, etc.

Next the user identifies his/her institution at 203, which will generally be the bank issuing the card. In the case of an ATM or debit card (selected at 204), it may also be useful to enter the bank branch at 205. Then, the user selects the accounts at 206 to be accessible via this card.

The user will then be asked at 207 to select a PIN number for use with this card.

The system then contacts at 208 the institution controlling the accounts to be accessed. The collected information including the new card number, identification and authentication information, branch and account information is submitted to the institution at 210.

If the institution approves the request, and if the card number is known or acceptable to the institution, if for example the submitted number was pre-allocated, the institution tells the system that the card is activated. However, the institution may not participate in this system, or may refuse the transaction for other reasons, such as insufficient user authentication, in which case a failure message at 209 is issued detailing this.

Another possibility is that the institution accepts the request to issue a new card, but instead issues a different card number than the one submitted, so the system checks at 211 to see if a new card number was returned. If so, the new number is stored and associated it with the originally submitted card number, at 212. The system will then act as a proxy for future requests made using the original card number.

The system then checks at 213 to see if the institution imposed any additional restrictions on use of the new card such as reduced credit availability, restrictions on cash withdrawals, inability to perform deposits, or limiting the validity of the card itself to a predetermined amount of time, reflecting the greater risk from transactions originating from a card activated in this manner, or in the case of providing temporary access until a new card to arrives by mail, etc. If so, these restrictions are reported to the user at 214.

Finally, the system notifies at 215 the user that the card activation has succeeded and his/her card is ready to use, and the transaction ends at 216.

Figure 3:
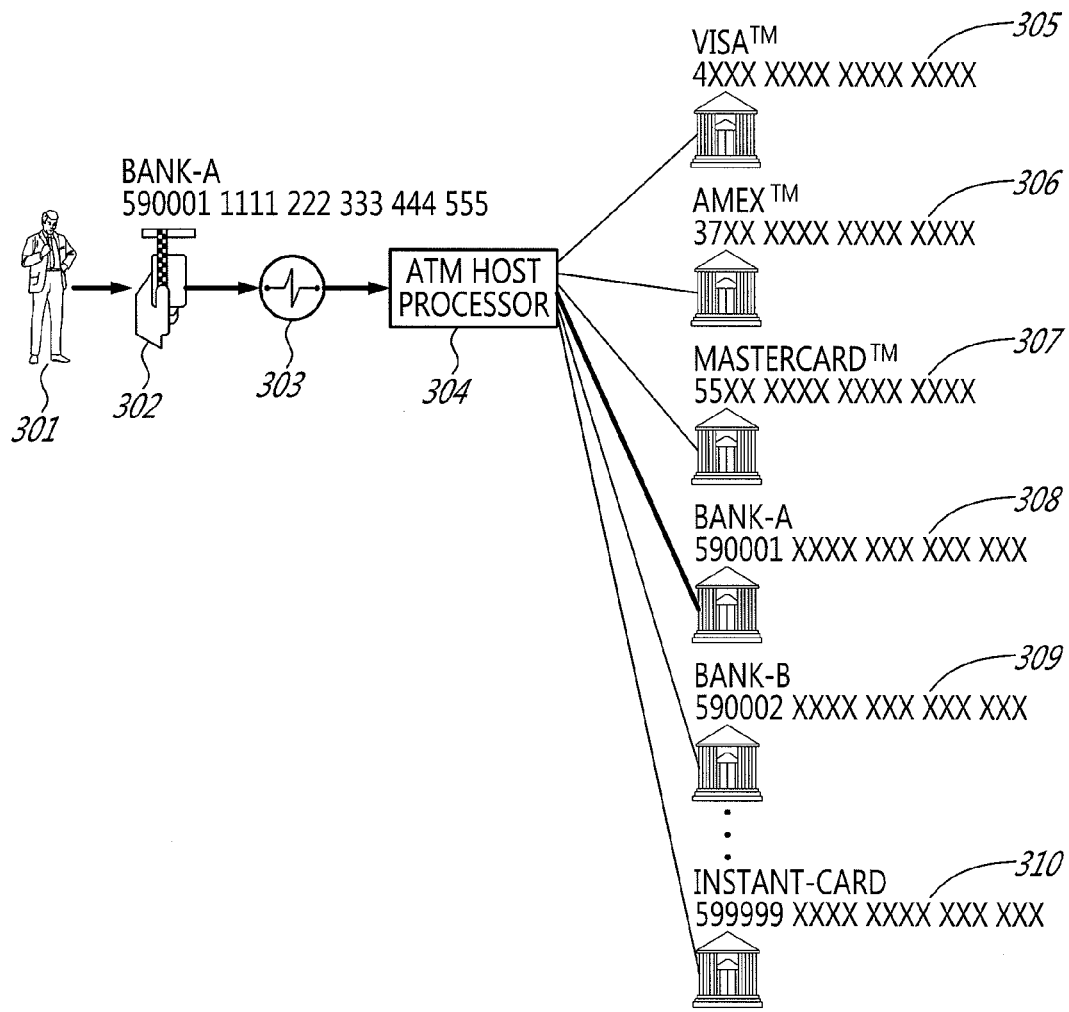
FIG. 3 is a schematic diagram showing an ATM transaction.

Turning now to FIG. 3, a schematic diagram of an ATM transaction is shown. The user 301 uses his/her ATM card 302 with the number 590001 1111 222 333 444 555 which communicates via a network 303 to an ATM host processor 304 which can communicate with a number of institutions 305-310. The transaction is routed to Bank-A 308 because its institution number 590001 matches the first 6 digits (the IIN) of the bank card being used.

In this example we will assume that the user has registered the accounts he/she wished to access at Bank-A using the procedure detailed in FIG. 2, and that Bank-A has accepted the transaction, returning new card number 590001 1111 222 333 444 999 which is stored by the system and associated with the newly activated card number 599999 1111 222 333 444 555.

Figure 4:
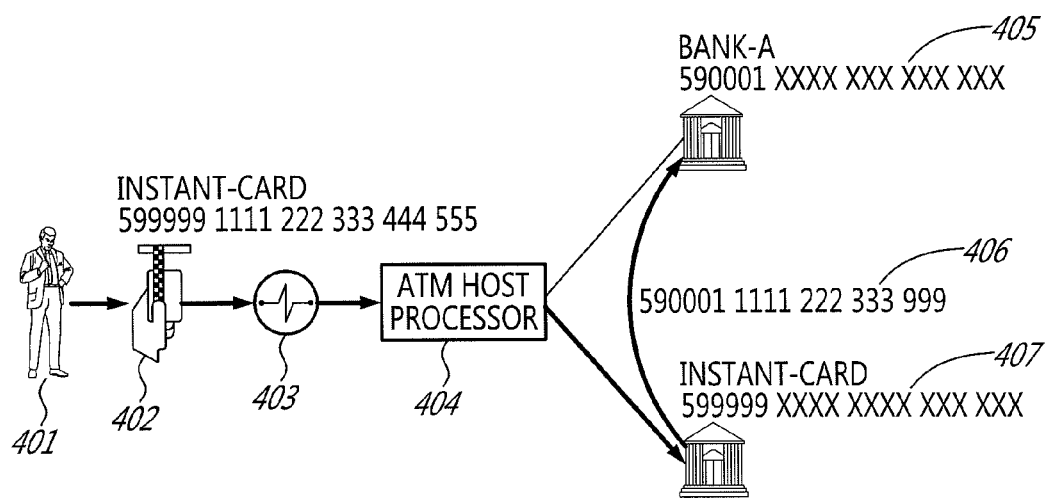
FIG. 4 is a schematic diagram showing an ATM transaction using a newly activated card which must be routed to the user's bank.

Turning now to FIG. 4, a schematic diagram of an ATM transaction using the instantly activated card is shown. The user 401 uses his/her instantly activated ATM card 402 with the number 599999 1111 222 333 444 555, which communicates via a network 403 to an ATM host processor 404. The transaction is routed to Instant-Bank 407 because its institution number 599999 matches the first 6 digits (the IIN) of the bank card being used.

The system at Instant-Bank 407 looks up the incoming card number 402, sees that it is associated with new card number 406. In one embodiment the system simply forwards the transaction to Bank-A 405 using this stored number 406, Bank-A then completes the transaction as usual. In another embodiment, upon receipt of the transaction request, Instant-Bank 406 may issue a second, equivalent transaction with Bank-A 405. If this transaction succeeds, the original transaction with the ATM host 404 likewise succeeds. If it fails, the original transaction fails as well.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A method for obtaining a new financial card for a user, the method comprising the steps of:
   a) providing the user with a pre-encoded card wherein a number of the pre-encoded card is associated with a pre-existing unactivated account;
   b) having the user provide sufficient identification information about the user and on the pre-existing account;
   c) providing the financial institution controlling the pre-existing account with the identification information collected in step b), and having the financial institution evaluate this information; and,
   d) activating the new card upon acceptance by the financial institution,
   and wherein in step c), the financial institution provides a card number different from the originally submitted card number associated with the new card selected in step a), and wherein in such a case, the card number provided by the financial institution is associated with the originally submitted card number.

2. A method as defined in claim 1, wherein the new card selected in step a) is pre-encoded with a unique identifier, and wherein in step c) the unique identifier is provided to the financial institution.

3. A method as defined in claim 1, wherein the new card selected in step a) has a pre-allocated number.

4. A method as defined in claim 1, wherein the new card selected in step a) is pre-printed with information relating to the financial institution.

5. A method as defined in claim 1, wherein between steps a) and c), the user provides information on the financial institution.

6. A method for obtaining a new financial card for a user, the method comprising the steps of:
   a) providing the user with a pre-encoded card wherein a number of the pre-encoded card is associated with a pre-existing unactivated account;
   b) having the user provide sufficient identification information about the user and on the pre-existing account;
   c) providing the financial institution controlling the pre-existing account with the identification information collected in step b), and having the financial institution evaluate this information; and
   d) activating the new card upon acceptance by the financial institution, and
   wherein in cases where the new card is not provided with a pre-allocated account number assigned by the financial institution, the new card is encoded with pre-allocated numbers issued by an operator of the service supplying the new card.

7. A method as defined in claim 6, wherein the new card selected in step a) is pre-encoded with a unique identifier, and wherein in step c), the unique identifier is provided to the financial institution.

8. A method as defined in claim 7, wherein the new card selected in step a) has a pre-allocated number.

9. A method as defined in claim 6, wherein the new card selected in step a) is pre-printed with information relating to the financial institution.

10. A method as defined in claim 6, wherein between steps a) and c), the user provides information on the financial institution.

11. A system for providing a new financial card to a user upon a user's request therefor, comprising a series of pre-encoded cards wherein numbers of the pre-encoded cards are associated with pre-existing unactivated accounts, means for collecting sufficient identification information about the user and on a pre-existing account of the user, a financial transaction system capable of receiving the identification information, of transmitting the identification information to a financial institution and, where the financial institution has approved the request, of providing an activated new card from the series of cards, the new card being associated with the existing account at the financial institution, the financial transaction system comprising a terminal and a communicating device for allowing the terminal to communicate with the financial institution over at least one communication network, and wherein a card-providing means is provided at the terminal such that the activated new card is dispensed to the user by the terminal.

12. A system as defined in claim 11, wherein the financial transaction system is adapted to receive at the terminal and to transmit to the financial institution information provided at the terminal by the user for the identification of the user.

13. A system as defined in claim 12, wherein the information includes at least one of information on the financial institution and a selection by the user of the account to be accessible via the new card.

14. A system as defined in claim 11, wherein the terminal is adapted to relay from the financial institution to the user restriction(s) imposed thereby on the use of the new card.

15. A system for providing a new financial card to a user upon a user's request therefor, comprising a series of pre-encoded cards wherein numbers of the pre-encoded cards are associated with pre-existing accounts, means for collecting sufficient identification information about the user and on a pre-existing account of the user, a financial transaction system capable of receiving the identification information, of transmitting the identification information to a financial institution and, where the financial institution has approved the request, of providing an activated new card from the series of cards, the new card being associated with the existing account at the financial institution, the financial transaction system comprising a terminal and a communicating device for allowing the terminal to communicate with the financial institution over at least one communication network, and wherein the series of new cards are provided at the terminal and are pre-encoded with a unique identifier, and wherein the financial transaction system is capable of receiving the unique identifier and of transmitting the unique identifier to the financial institution.

16. A system as defined in claim 15, wherein the financial transaction system is adapted to receive at the terminal and to transmit to the financial institution information provided at the terminal by the user for the identification of the user.

17. A system as defined in claim 16, wherein the information includes at least one of information on the financial institution and a selection by the user of the account to be accessible via the new card.

18. A system as defined in claim 15, wherein the terminal is adapted to relay from the financial institution to the user restriction(s) imposed thereby on the use of the new card.

19. A system for providing a new financial card to a user upon a user's request therefor, comprising a series of pre-encoded cards wherein numbers of the pre-encoded cards are associated with pre-existing unactivated accounts, means for collecting sufficient identification information about the user and on a pre-existing account of the user, a financial transaction system capable of receiving the identification information, of transmitting the identification information to a financial institution and, where the financial institution has approved the request, of providing an activated new card from the series of cards, the new card being associated with the existing account at the financial institution, the financial transaction system comprising a terminal and a communicating device for allowing the terminal to communicate with the financial institution over at least one communication network, and wherein the series of new cards are provided at the terminal and have pre-allocated numbers.

20. A system as defined in claim 19, wherein the financial transaction system is adapted to receive at the terminal and to transmit to the financial institution information provided at the terminal by the user for the identification of the user.

21. A system as defined in claim 20, wherein the information includes at least one of information on the financial institution and a selection by the user of the account to be accessible via the new card.

22. A system as defined in claim 19, wherein the terminal is adapted to relay from the financial institution to the user restriction(s) imposed thereby on the use of the new card.

23. A system for providing a new financial card to a user upon a user's request therefor, comprising a series of pre-encoded cards wherein numbers of the pre-encoded cards are associated with pre-existing unactivated accounts, means for collecting sufficient identification information about the user and on a pre-existing account of the user, a financial transaction system capable of receiving the identification information, of transmitting the identification information to a financial institution and, where the financial institution has approved the request, of providing an activated new card from the series of cards, the new card being associated with the existing account at the financial institution, the financial transaction system comprising a terminal and a communicating device for allowing the terminal to communicate with the financial institution over at least one communication network, and wherein the series of new cards are provided at the terminal and have pre-printed information thereon related to the financial institution.

24. A system as defined in claim 23, wherein the financial transaction system is adapted to receive at the terminal and to transmit to the financial institution information provided at the terminal by the user for the identification of the user.

25. A system as defined in claim 24, wherein the information includes at least one of information on the financial institution and a selection by the user of the account to be accessible via the new card.

26. A system as defined in claim 23, wherein the terminal is adapted to relay from the financial institution to the user restriction(s) imposed thereby on the use of the new card.

* * * * *

UNITED STATES PATENT AND TRADEMARK OFFICE
CERTIFICATE OF CORRECTION

| | | |
|---|---|---|
| PATENT NO. | : 8,464,940 B2 | Page 1 of 1 |
| APPLICATION NO. | : 13/157571 | |
| DATED | : June 18, 2013 | |
| INVENTOR(S) | : Sean MacGuire | |

It is certified that error appears in the above-identified patent and that said Letters Patent is hereby corrected as shown below:

Title Page, Item (63), delete "11/995,625" and insert -- 11/995,623 -- therefor

In the Specification

Column 1, Line 7, delete "11/995,625" and insert -- 11/995,623 -- therefor

Signed and Sealed this
Twenty-fourth Day of September, 2013

Teresa Stanek Rea
*Deputy Director of the United States Patent and Trademark Office*